United States Patent
Huang

(10) Patent No.: US 8,223,258 B2
(45) Date of Patent: Jul. 17, 2012

(54) BACKLIGHT PHOTOGRAPHING METHOD

(75) Inventor: Ssu-Hua Huang, Changhua County (TW)

(73) Assignee: Altek Corporation, Hsinchu (TW)

( * ) Notice: Subject to any disclaimer, the term of this patent is extended or adjusted under 35 U.S.C. 154(b) by 297 days.

(21) Appl. No.: 12/720,437

(22) Filed: Mar. 9, 2010

(65) Prior Publication Data
US 2011/0050937 A1 Mar. 3, 2011

(30) Foreign Application Priority Data
Aug. 26, 2009 (TW) ................................ 98128728 A

(51) Int. Cl.
*H04N 5/238* (2006.01)
*H04N 5/222* (2006.01)
(52) U.S. Cl. ........................................ 348/364; 348/371
(58) Field of Classification Search .................. None
See application file for complete search history.

(56) References Cited

U.S. PATENT DOCUMENTS

| 6,950,141 B2 | 9/2005 | Mori et al. | |
| 2004/0239796 A1* | 12/2004 | Imai | 348/362 |
| 2005/0036709 A1* | 2/2005 | Imai | 382/286 |
| 2009/0167932 A1* | 7/2009 | Nakajima | 348/362 |

FOREIGN PATENT DOCUMENTS

| TW | 501364 | 9/2002 |
| TW | 200821742 | 5/2008 |

* cited by examiner

*Primary Examiner* — Albert Cutler
(74) *Attorney, Agent, or Firm* — Morris Manning & Martin LLP; Tim Tingkang Xia, Esq.

(57) ABSTRACT

A backlight photographing method is applicable in a digital camera. In the backlight photographing method, a backlight detection program is first executed to obtain a backlight flag. Next, when the backlight flag is in a backlight status, a flash is emitted and a photo is photographed. In addition, photographing parameters of the digital camera may be adjusted according to a low brightness characteristic value acquired by the backlight detection program, so as to obtain a photo having a foreground with a preferred exposure effect.

4 Claims, 6 Drawing Sheets

BACKLIGHT PHOTOGRAPHING METHOD

CROSS-REFERENCE TO RELATED APPLICATIONS

This non-provisional application claims priority under 35 U.S.C. §119(a) on Patent Application No(s). 098128728 filed in Taiwan, R.O.C. on Aug. 26, 2009, the entire contents of which are hereby incorporated by reference.

BACKGROUND OF THE INVENTION

1. Field of Invention

The present invention relates to a backlight photographing method, and more particularly to a photographing method in which photographing parameters of a digital camera are adjusted after backlight detection.

2. Related Art

A backlight photographing situation might occur both indoors and outdoors for photographing with a digital camera. The backlight photographing usually make foreground (that is, predetermined object to be photographed) too dark and background too bright, such that the foreground is unable to be clearly seen in the obtained photo.

In order to overcome this backlight photographing problem, persons in the industry propose different solutions. For example, in Taiwan Patent Application No. 200821742 published on May 16, 2008, a system and a method for flashlight control for backlight photographing are disclosed. In this solution, a difference of aperture values between background and foreground is set first and flashlight is then utilized for compensation. A subject to be photographed is first metered to obtain an aperture value of the foreground. Then the background is metered, and an aperture value of the background is obtained similarly. The difference of aperture values between the background and the foreground is then set. Subsequently, the subject is focused, so as to calculate a distance of the subject. Next, a required flashlight index of the flashlight is calculated according to the aperture value obtained from the aperture value difference for backlight photographing.

In Taiwan Patent No. 501364, issued on Sep. 1, 2002, a camera device and a photographing method are proposed. The method and device utilize software for backlight determination.

In U.S. Pat. No. 6,950,141, a camera that controls image sensor exposure is disclosed. In a front-lighted, back-lighted or over-front-lighted condition, an average exposure is obtained. Especially, the area to be photographed is divided into 64 regions. The camera compares the regions to calculate an average brightness, including an average value of an upper half of the image, an average value of a lower half of the image, and average values for other different considerations, thereby controlling the exposure of an image sensor accordingly.

As can be seen from the solutions proposed in the industry, it is a goal requiring constant efforts for the industry to photograph a photo with a good image effect in backlight.

SUMMARY OF THE INVENTION

In view of the above problems, the present invention is a backlight photographing method, thereby solving a problem of undesirable foreground image effect in the backlight photographing.

The present invention provides a backlight photographing method applicable in a digital camera. The method comprises the following steps. In Step S30, a backlight detection program is executed to obtain a backlight flag. In Step S50, when the backlight flag is in the backlight status, a flash is emitted.

The backlight detection program comprises the following steps. In Step S32, an image is captured. In Step S33, a target region is selected from the image and the target region has a plurality of blocks. In Step S34, a brightness representative value of each block is calculated respectively. In Step S35, it is calculated that an amount of the blocks having the brightness representative value higher than a first threshold value is a high brightness block number. In Step S36, it is calculated that an amount of the blocks having the brightness representative value lower than a second threshold value is a low brightness block number. In Step S37, when the high brightness block number is higher than a third threshold value and the low brightness block number is higher than a fourth threshold value, the backlight flag is set in the backlight status.

The calculating a brightness representative value of each block respectively in Step S34 is averaging gray scale values of the pixels in the same block sequentially to obtain an average value as the brightness representative value of the block.

Before a flash is emitted when the backlight flag is in the backlight status in Step S50, the method disclosed in the present invention further comprises Step S40. In Step S40, when the backlight flag is in the backlight status, a parameter adjustment program is executed.

The parameter adjustment program comprises the following steps. In Step S42, brightness representative values of the blocks having the brightness representative value lower than the second threshold value are averaged to obtain a low brightness characteristic value. In S44, a photographing parameter of the digital camera is adjusted according to the low brightness characteristic value.

The method disclosed in the present invention may comprise emitting no flash when the backlight flag is in a non-backlight status.

BRIEF DESCRIPTION OF THE DRAWINGS

The present invention will become more fully understood from the detailed description given herein below for illustration only, and thus are not limitative of the present invention, and wherein:

FIG. 3 is a schematic flow chart of a backlight detection program according to an embodiment of the present invention;

DETAILED DESCRIPTION OF THE INVENTION

The detailed features and advantages of the present invention below is sufficient to make any person skilled in the art to understand the technical contents of the present invention and perform implementation accordingly. Also, according to the contents disclosed in the specification, claims and accompanying drawings, any person skilled in the art may easily understand related objectives and advantages of the present invention.

Figure 1:
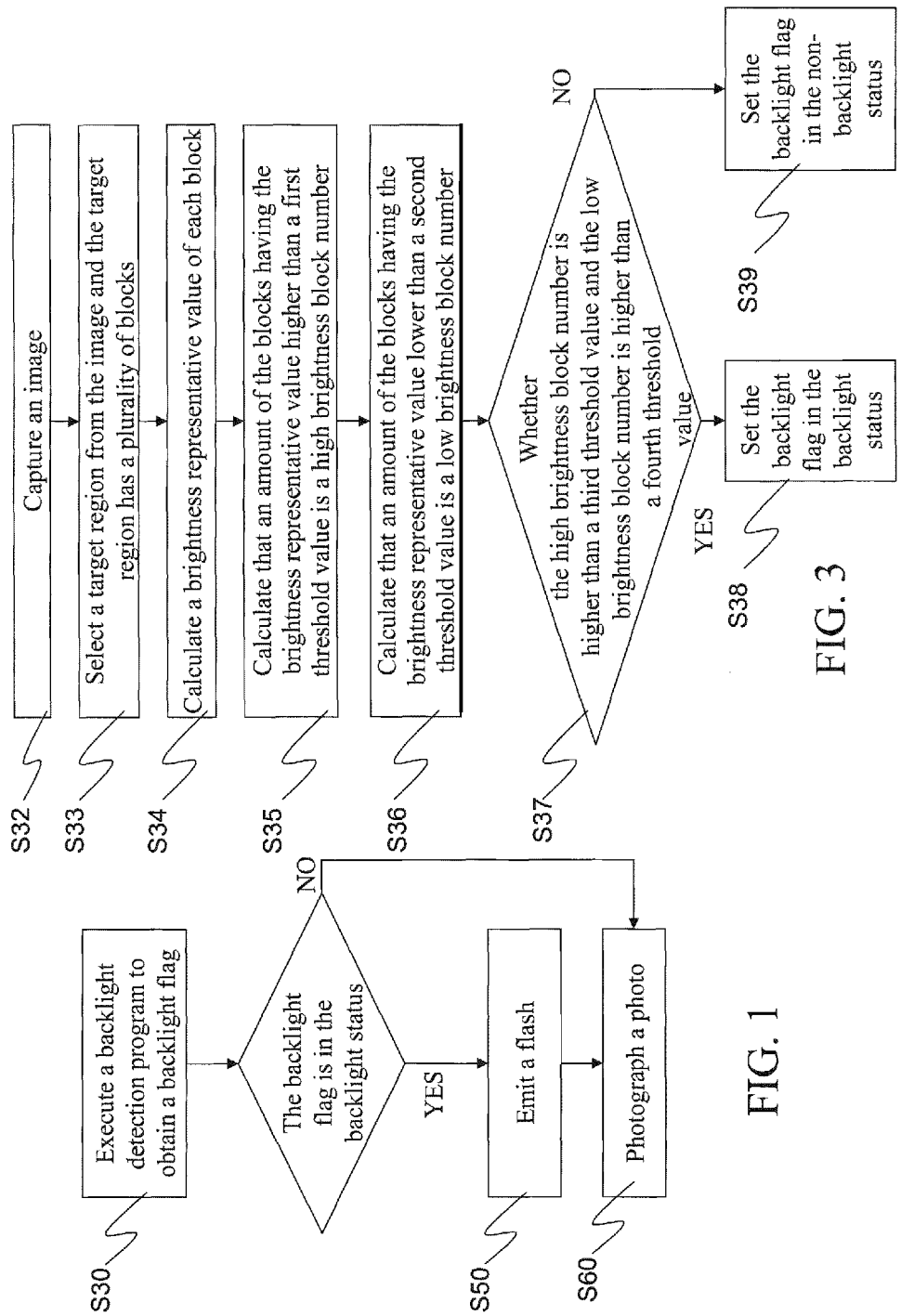
FIG. 1 is a schematic flow chart of a backlight photographing method according to an embodiment of the present invention.

Referring to FIG. 1, a backlight photographing method according to an embodiment of the present invention is applicable to a digital camera. The backlight photographing method comprises the following steps. In Step S30, a backlight detection program is executed to obtain a backlight flag. In Step S50, when the backlight flag is in a backlight status, a flash is emitted. In Step S60, a photo is photographed.

Figure 2:
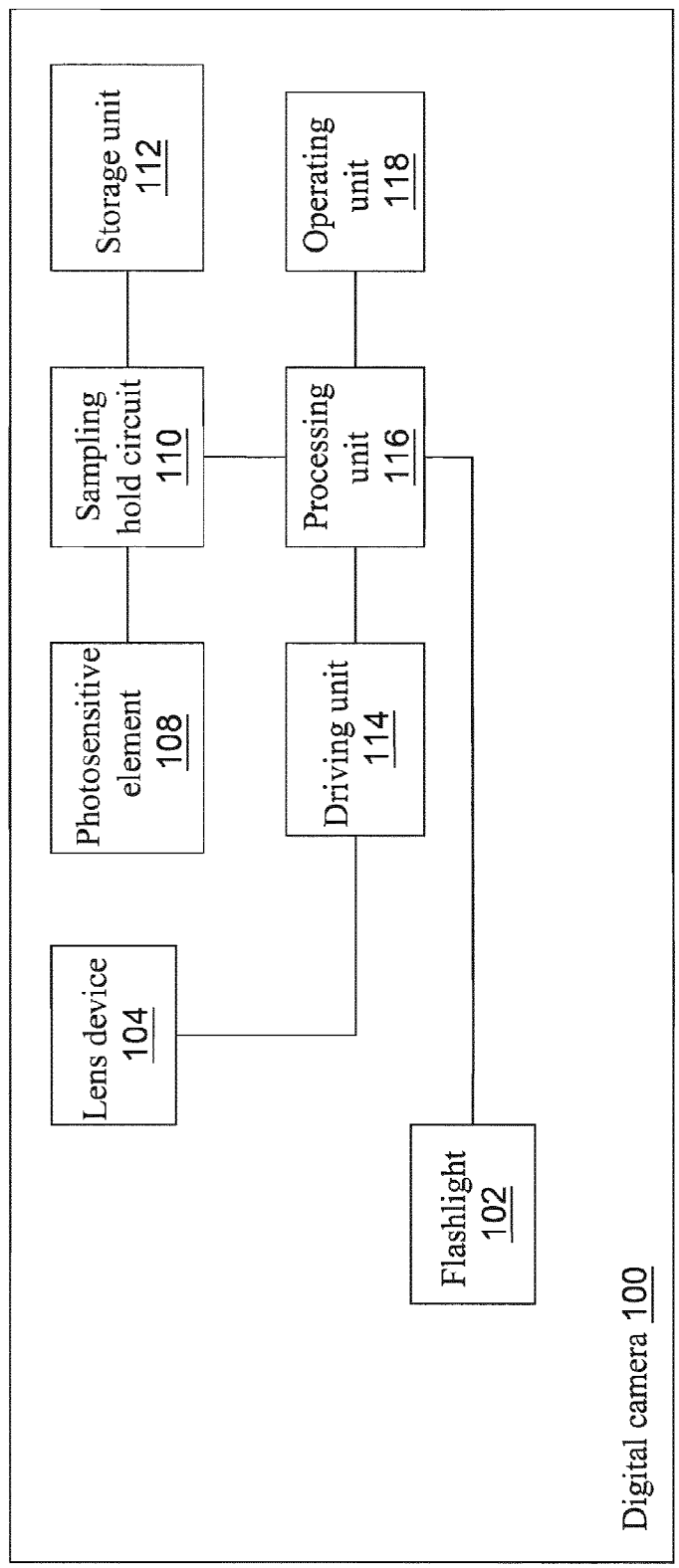
FIG. 2 is a schematic structural view of a digital camera in which a backlight photographing method is applicable according to an embodiment of the present invention.

The digital camera may be any digital image capture device, which may be, but not limited to, a structure as shown in FIG. 2. FIG. 2 is a schematic structural view of a digital camera applying the method according to the present invention is applicable.

A digital camera 100 comprises a flashlight 102, a lens device 104, a photosensitive element 108, a sampling hold circuit 110, a storage unit 112, a driving unit 114, a processing unit 116, and an operating unit 118. The lens device 104 comprises an aperture device and a shuttle device. The photosensitive element 108 may be, but not limited to a charge-couple-device (CCD). Light rays reflected by sceneries enter the photosensitive element 108 through the lens device 104. The photosensitive element 108 converts the entered light rays into image signals and transfers the image signals to the sampling hold circuit 110 to be recorded in the storage unit 112.

During photographing, the processing unit 116 actuates the driving unit 114 to move the lens device 104 to a specified focal length position. At the same time, the processing unit 116 adjusts the aperture device through the driving unit 114. The photosensitive element 108 is aligned with the lens device 104 and converts image pictures in a current scene into electrical signals of a digital image. Driven by the processing unit, the sampling hold circuit 110 transfers image signals received by the photosensitive element 108 to the storage unit 112. The processing unit 116 is used for determining a focal length that the lens device 104 needs to be adjusted according to a preview image captured in a stage of imaging preview for the photographing of the digital camera 100.

Next, referring to FIGS. 1 and 2 at the same time, the backlight detection program in Step S30 utilizes software to determine a live view, and obtain a backlight flag after determine. The backlight flag has two statuses. One is a backlight status, representing that the current image has backlight. The other one is a non-backlight status, representing that the current image has no backlight. The digital camera is able to adjust parameters for subsequent photographing through the settings of the backlight flag. The backlight detection program is illustrated in detail below.

In Step S30, it is determined whether it is backlight photographing or not, that is, whether the backlight flag is in the backlight status or not. If yes, the processing unit 116 drives the flashlight 102 to emit a flash, which is Step S50. Next, Step S60 is performed in which a photo (a digital photo) is photographed. For photographing the photo here, the processing unit 116 drives the sampling hold circuit 110 to enable the sampling hold circuit 110 to capture image signals from the photosensitive element 108 and transfer the image signals to the storage unit 112 to be stored.

In addition, when the backlight flag is in the non-backlight status, no flash is emitted. Step S60 is performed directly to photograph a photo.

Refer to FIG. 3 for the backlight detection program. FIG. 3 is a schematic flow chart of a backlight detection program according to an embodiment of the present invention. The backlight detection program comprises the following steps. In Step S32, an image is captured. In Step S33, a target region is selected from the image. The target region has a plurality of blocks. Step S34, a brightness representative value of each block is calculated respectively. In Step S35, it is calculated that an amount of the blocks having the brightness representative value higher than a first threshold value is a high brightness block number. In Step S36, it is calculated that an amount of the blocks having the brightness representative value lower than a second threshold value is a low brightness block number. In Step S37, it is determined whether the high brightness block number is higher than a third threshold value and whether the low brightness block number is higher than a fourth threshold value. In Step S38, the backlight flag is set at a backlight status.

The backlight detection program is executed by the processing unit 116 in cooperation with the sampling hold circuit 110, the photosensitive element 108, and the storage unit 112.

Figure 4:
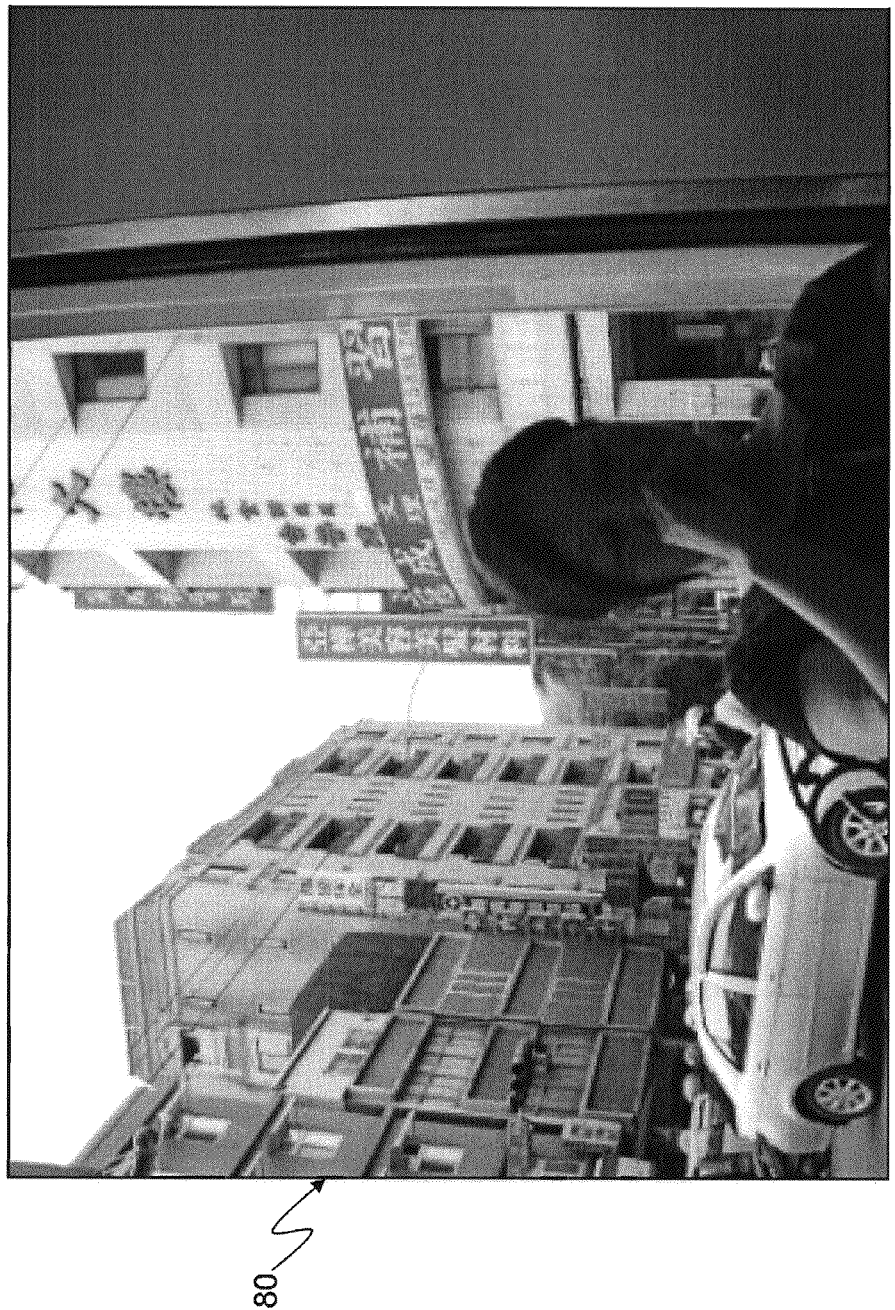
FIG. 4 is a schematic view of an image captured in Step S32 according to an embodiment of the present invention.

FIG. 4 is a schematic view of an image 80 captured in Step S32 according to an embodiment of the present invention. In Step 32, the processing unit 116 actuates the sampling hold circuit 110 to enable the sampling hold circuit 110 to capture an image 80 from the photosensitive element 108. The image 80 may be a live view when the camera is in a preview stage (usually referred to as an S0 stage), or may also be the image 80 captured when the camera is in an automatic focusing stage. The automatic focusing stage means a stage that a user half press a shuttle after an object to be photographed is aligned (usually referred to as an S1 stage). Of course, the image 80 captured by the Step S32 may also be an image 80 captured when the user totally press the shuttle to have the digital camera in a shooting stage (usually referred to as an S2 stage).

Figure 5:
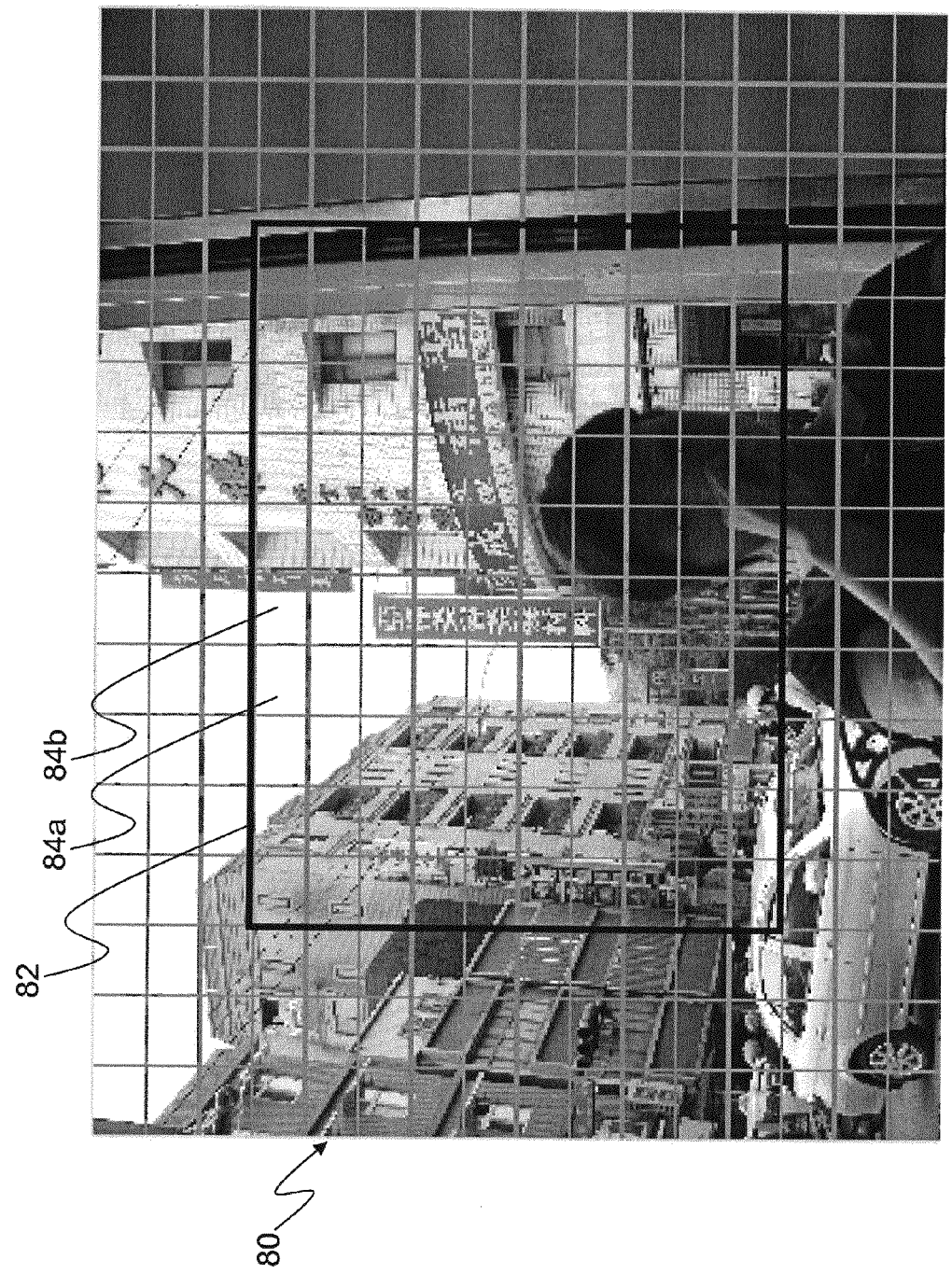
FIG. 5 is a schematic view of a target region in Step S33 according to an embodiment of the present invention.

Refer to FIG. 5 at the same time. Next, Step S33 is executed, in which a target region 82 is selected from the image 80 and the target region 82 has a plurality of blocks 84a, 84b. The selection of the target region 82 may be as shown in FIG. 5 that the target region is located at a center area of the whole image 80. However, the present invention is not limited thereto. The target region may also be set as a specific region of the image 80, for example, to the right, to the left, to the upside, to the downside or the whole region of the image 80. In addition, the target region 82 is also not limited to a rectangular or to one region. When the digital camera 100 applying the method has a function of a focusing block, the target region 82 may also be the focusing block or a region by enlarging four sides of the focusing block using the focusing block as a center. When the digital camera 100 applying the method has a main object detection function or a scene analysis function, the target region 82 may also be set according to the detection or analysis results. Taking FIG. 5 as an example, for the selection of this target region 82, a horizontal axis and a vertical axis of the image 80 are cut into 16 equal parts having an equal length respectively. However, the block cutting mode is not limited thereto. 10×10 blocks 84a, 84b at the center are selected to be the target region 82. Each block 84a or 84b has a plurality of pixels.

Next, Step S34 is executed, in which a brightness representative value of each block 84a, 84b is calculated respectively. The calculation of the brightness representative value is averaging gray scale values of the pixels in the same block 84a or 84b sequentially. The average may be arithmetic average, geometric average or weighted average or any other calculation modes that are able to calculate a gray scale value capable of representing the pixels, such that the gray scale value is used as the brightness representative value of the block 84a, 84b. That is, each block 84a or 84b has a brightness representative value. The calculation of the gray scale value may be, but not limited to the following mode that reading values of three colors red, green, and blue (R, G, B) of each pixel are substituted in the gray scale formula Y=0.6G+ 0.3R+0.1B to calculate the gray scale value of the pixel. The Y denotes the gray scale value. After the gray scale value of each pixel is obtained, the gray scale values of all the pixels in the same block 84a or 84b are averaged, so as to obtain a brightness representative value of the block 84a or 84b.

Figure 6:
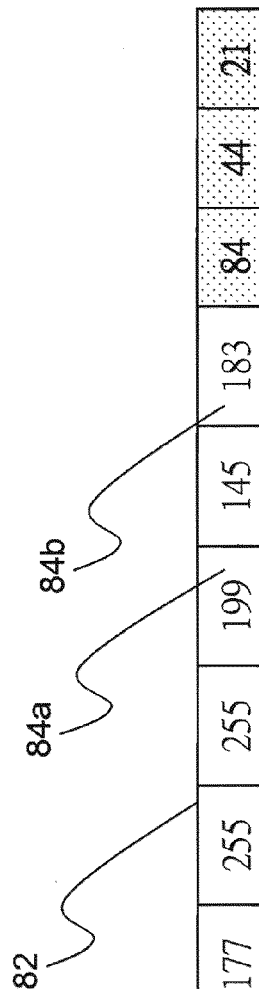
FIG. 6 is a schematic view of a brightness representative value of each block in Step S34 according to an embodiment of the present invention.

After Step S34 is executed, a schematic view of the brightness representative value of each block shown in FIG. 6 is then obtained. A range of the calculated gray scale value in FIG. 6 takes an example of a range between 0 and 255. However, the present invention is not limited thereto. A higher value indicates a greater brightness, that is, brighter or a whiter color.

Next, Step S35 is executed, in which it is calculated that an amount of blocks having a brightness representative value higher than a first threshold value is a high brightness block number. The first threshold value indicates a high brightness threshold value, that is to say, a threshold value used for determining whether the block is a high brightness block or not. Taking FIG. 6 as an example, the first threshold value may be set as 130. Therefore, for FIG. 6, after Step S35 is executed, the obtained high brightness block number is 18.

Next, Step S36 is executed, in which it is calculated an amount of blocks having a brightness representative value lower than a second threshold value is a low brightness block number. The second threshold value indicates a low brightness threshold value, which is a threshold value used for determining whether a block is low brightness block or not. Taking FIG. 6 as an example, the second threshold value may be set as 15. Therefore, for FIG. 6, after Step S36 is executed, the obtained low brightness block number is 8.

In the end, Step S37 is executed, in which it is determined whether the high brightness block number is higher than a third threshold value or not and whether the low brightness block number is higher than a fourth threshold value or not. The third and fourth threshold values are used for determining whether a threshold value in a backlighting situation exists. The third threshold value is a threshold value of a high brightness block number. Taking FIG. 6 as an example, the third threshold value may be set as 10. The fourth threshold value is a threshold value of the low brightness block number. Taking FIG. 6 as an example, the fourth threshold value may be set as 5. Therefore, the high brightness block number and the low brightness block number calculated in Steps S35 and S36 are used in Step S37. If in Step S37, the determination result is yes, Step S38 is performed, in which the backlight flag is set in the backlight status. If the determination result in Step S37 is no, Step S39 is performed, in which the backlight flag is set in the non-backlight status.

As discussed above, after Steps S32 to S37 (that is, Step S30) are performed, Steps S50 and S60 are performed. As illustrated above, as the backlight detection program may be executed when the digital camera 100 is in the S0 (preview), the S1 (half-press the shuttle) or the S2 (totally-press the shuttle) stages, when Step S30 or the backlight detection program performs detection in the S0 or the S1 stage, the actions of emitting flash in Step S50 and photographing a photo in S60 are able to be not performed. When the camera enters the S2 stage later, the actions in Step S50 and Step S60 are then performed according to the detection result in the S0 or S1 stage. When Step S30 or the backlight detection program performs detection in the S2 stage, the emitting flash in Step S50 and the photographing the photo in S60 are then performed.

In addition, after the backlight detection program in Step S30 is executed, although the status of the backlight flag is obtained, the present invention is not limited thereto. That is to say, after the backlighting program is executed, Step S50 may be replaced by that a flash is emitted when the high brightness block number is higher than the third threshold value and the low brightness block number is higher than the fourth threshold value, and still the objective of the present invention is able to be achieved.

For the calculation mode in Step S34 that the brightness representative value of each block 84a or 84b is calculated respectively, besides using the gray scale value as the brightness representative value, the gray scale value may also be converted into a brightness value. That is to say, the gray scale value is substituted in the brightness value formula BV=log 2(Y). The BV indicates the brightness value. However, if this brightness formula is used for calculation, the first, second, third, fourth threshold values should be adjusted correspondingly to realize practical purposes.

Figure 7:
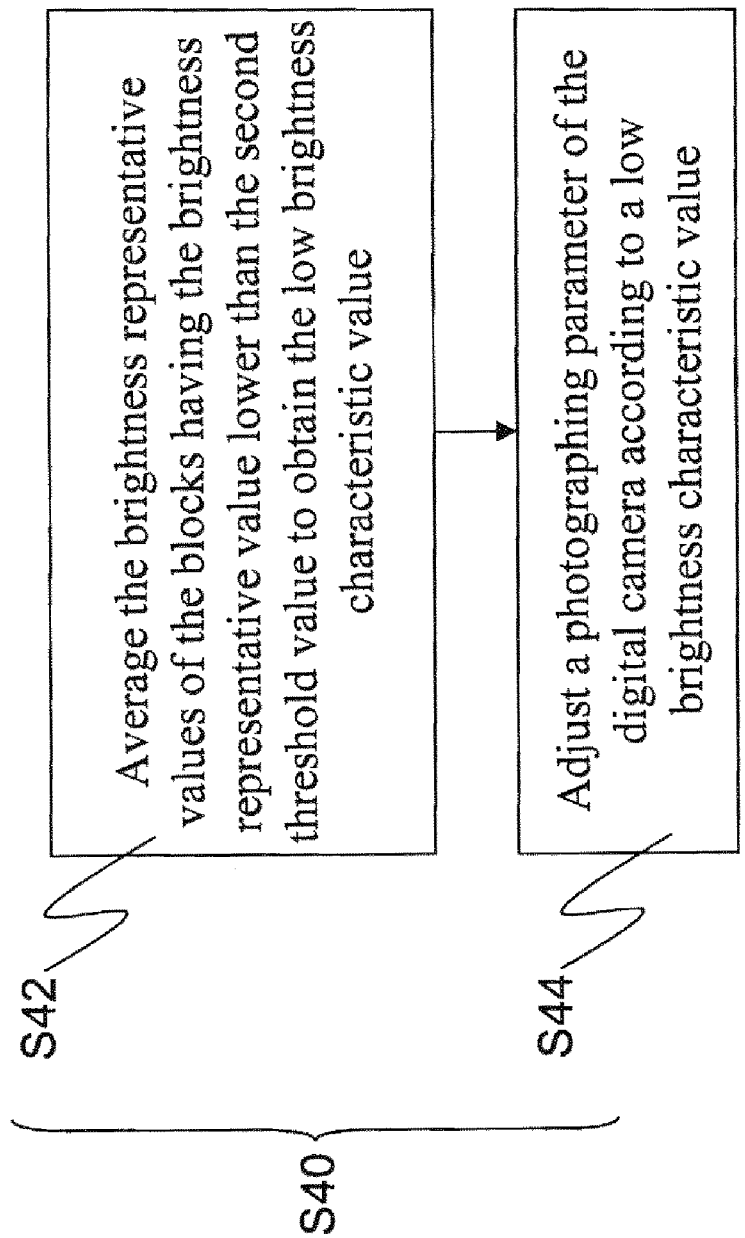
FIG. 7 is a schematic flow chart of Step S40 according to an embodiment of the present invention.

Moreover, before Step S50, the method may further comprise Step S40. When the backlight flag is in the backlight status, a parameter adjustment program is executed. FIG. 7 is a schematic flow chart of Step S40 according to an embodiment of the present invention. The parameter adjustment program comprises the following steps. In Step S42, the brightness representative values of the blocks 84a, 84b having the brightness representative value lower than the second threshold value are averaged to obtain a low brightness characteristic value. In Step S44, a photographing parameter of the digital camera 100 is adjusted according to the low brightness characteristic value.

Step S42 is performed for the brightness representative values of all blocks 84a and 84b in FIG. 6. At this time, an average value of the gray scale values of the 8 low brightness blocks in FIG. 6 is 8.125. The 8.125 is the low brightness characteristic value of Step S42. Next, the photographing parameter of the digital camera 100 is adjusted according to the low brightness characteristic value. The photographing parameter may be, but not limited to an aperture value, a shuttle speed, a light sensitivity, and a luminous intensity of a flashlight. Taking the luminous intensity of the flashlight as an example, when the low brightness characteristic value is lower, the luminous intensity of the flashlight is adjusted more intense, and the compensation effect is better.

Therefore, the backlight photographing method of the present invention may effectively detect and obtain whether the photographed object is in the backlight status, so as to perform compensation or adjust related photographing parameters, such that the photographed digital photo is clear and the objective of the present invention is achieved.

What is claimed is:

1. A backlight photographing method, applicable to a digital camera, comprising:
   executing a backlight detection program to obtain a backlight flag, wherein the backlight detection program comprises:
   capturing an image;
   selecting a target region from the image, wherein the target region has a plurality of blocks;
   calculating a brightness representative value of each block respectively;
   calculating that an amount of the blocks having the brightness representative value higher than a first threshold value is a high brightness block number;

calculating that an amount of the blocks having the brightness representative value lower than a second threshold value is a low brightness block number;

determining whether the high brightness block number is higher than a third threshold value or not and whether the low brightness block number is higher than a fourth threshold value or not;

setting the backlight flag in a backlight status if yes;

when the backlight flag is in the backlight status, executing a parameter adjustment program comprising:

averaging the brightness representative values of the blocks having the brightness representative value lower than the second threshold value to obtain a low brightness characteristic value; and adjusting a photographing parameter of the digital camera according to the low brightness characteristic value; and emitting a flash.

2. The backlight photographing method according to claim 1, wherein the calculating a brightness representative value of each block respectively comprises averaging gray scale values of a plurality of pixels in the same block sequentially to obtain an average value as the brightness representative value of the block.

3. The backlight photographing method according to claim 1, wherein the photographing parameter is selected from a group consisting of an aperture value, a shuttle speed, a light sensitivity, and a luminous intensity of a flashlight.

4. The backlight photographing method according to claim 1, after the step of determining whether the high brightness block number is higher than the third threshold value and whether the low brightness block number is higher than the fourth threshold value, further comprising:

setting the backlight flag in a non-backlight status; and emitting no flash when the backlight flag is in the non-backlight status.

* * * * *